Oct. 5, 1971 D. W. R. WALKER 3,610,098
APPARATUS FOR REMOVING SURPLUS MATERIAL FROM THE
SURFACE OF WORKPIECES OF ELONGATED FORM
Filed Nov. 7, 1968 6 Sheets-Sheet 1
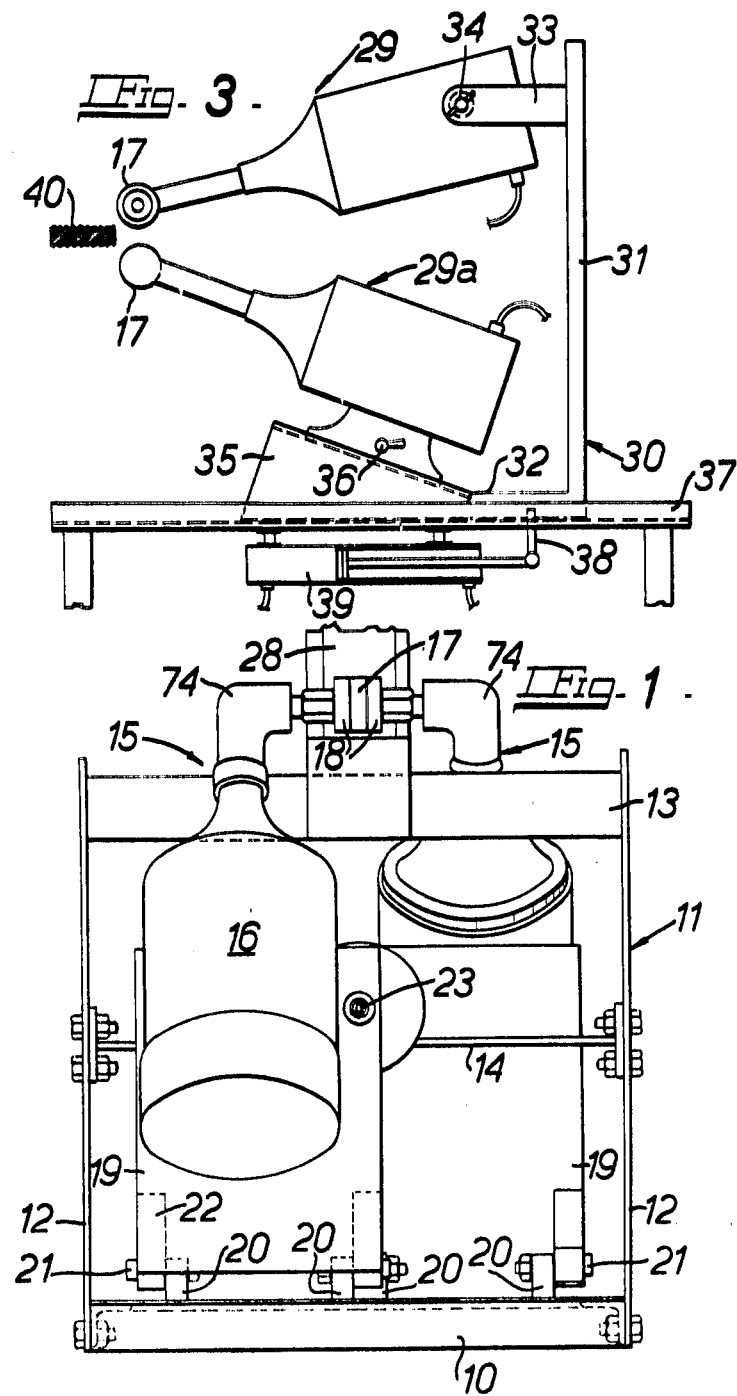

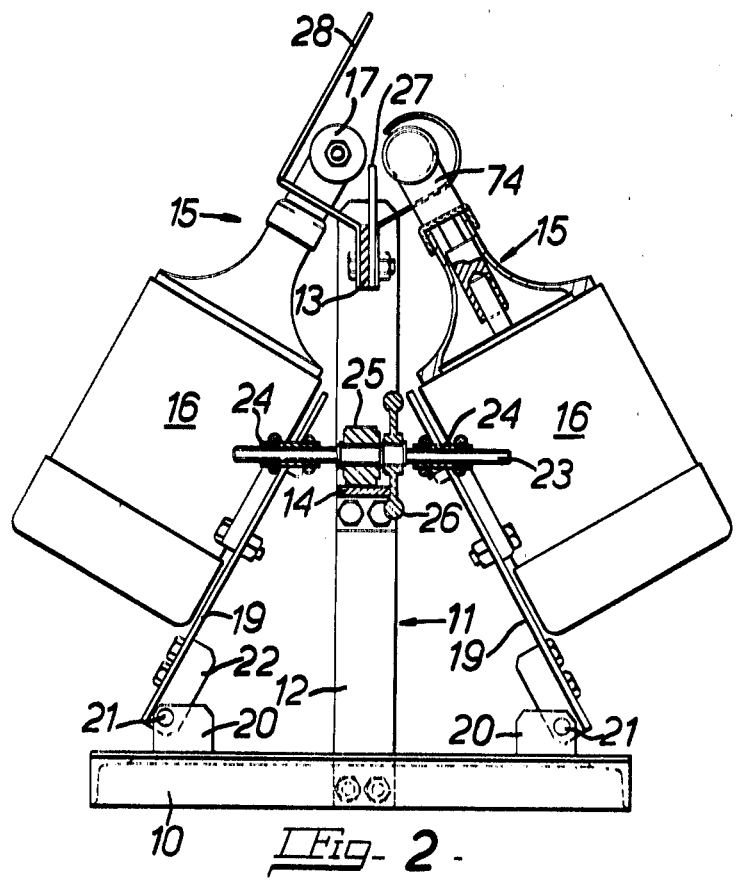

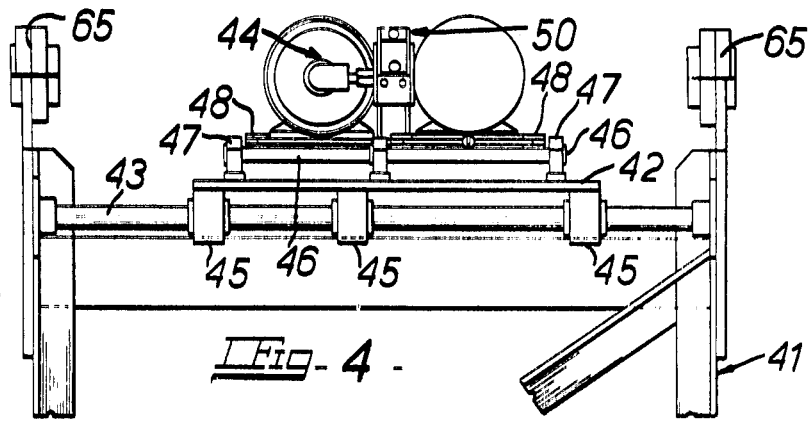
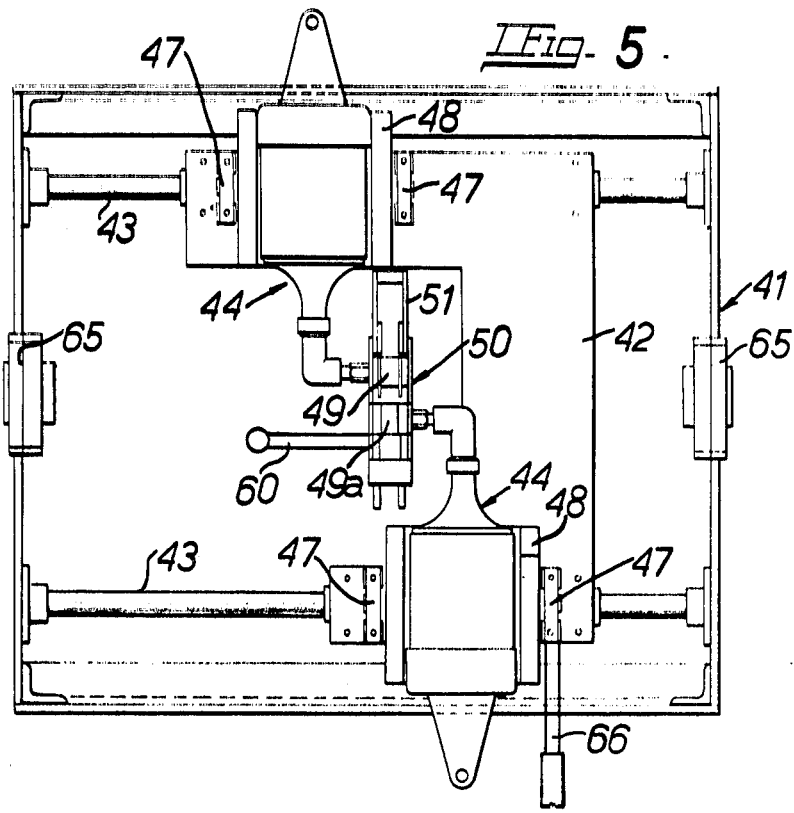

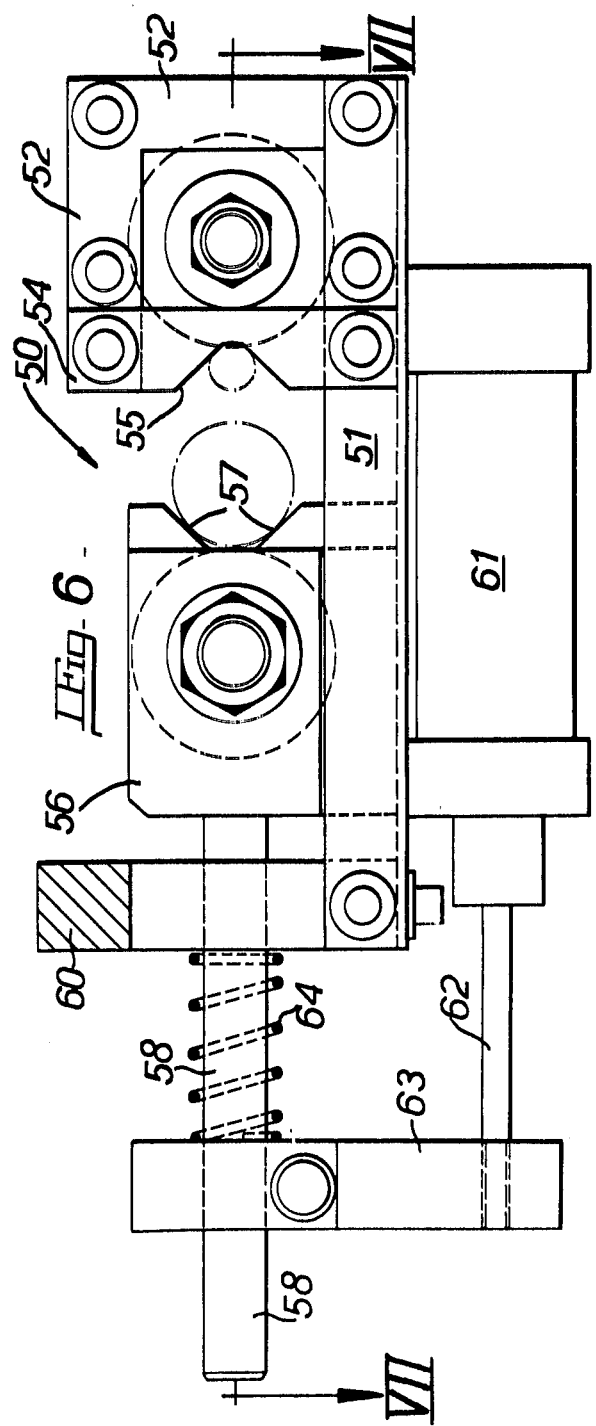

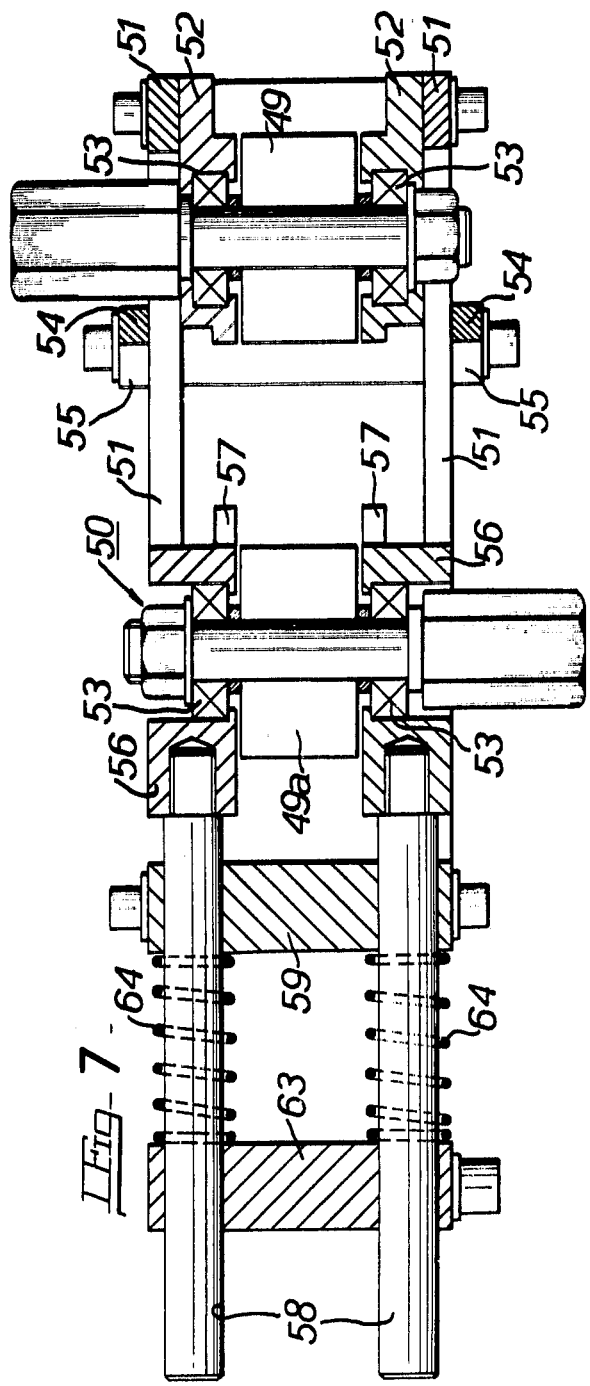

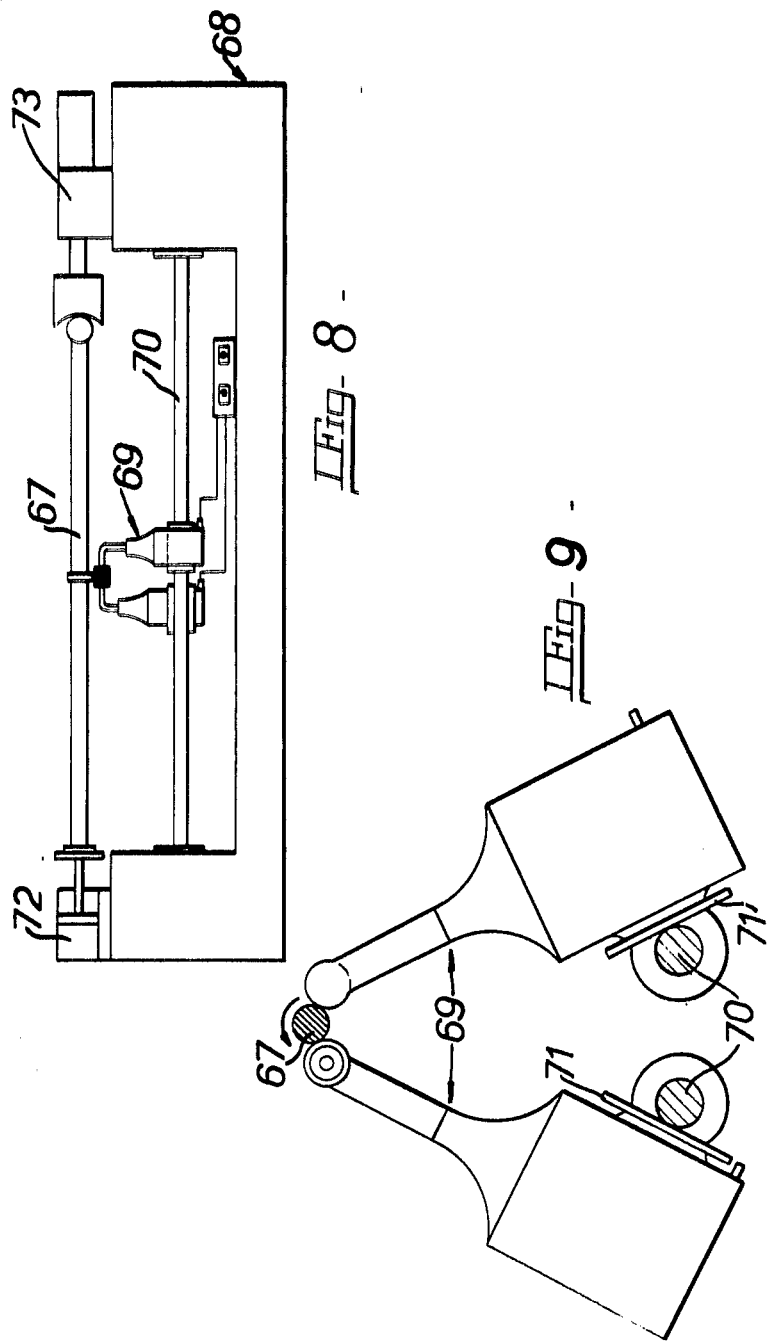

United States Patent Office 3,610,098
Patented Oct. 5, 1971

3,610,098
APPARATUS FOR REMOVING SURPLUS MATERIAL FROM THE SURFACE OF WORKPIECES OF ELONGATED FORM
Derek W. R. Walker, Four Gates, Hopstone, Claverley, near Wolverhampton, England
Filed Nov. 7, 1968, Ser. No. 774,068
Claims priority, application Great Britain, Nov. 16, 1967, 52,150/67
Int. Cl. B23c 3/04; B24b 5/36
U.S. Cl. 90—15                     12 Claims

ABSTRACT OF THE DISCLOSURE

This invention relates to apparatus for removing surplus material from the surface of bars, tubes and other elongated workpieces, and in particular the weld flash from a join between two lengths of material. The apparatus comprises a support and two or more power driven rotary milling cutters which are so mounted on the support that the cutters are in juxtaposition but can be adjusted relative to each other and brought into contact with opposed faces of a workpiece which is placed between them. Relative bodily movement of the cutters around the workpiece or the bodily movement of the workpiece relative to the cutters enabling flash to be removed from spaced areas simultaneously.

---

This invention relates to apparatus for removing surplus material from the surface of workpieces of elongated form.

Such apparatus may be used in forming smooth surfaces where components have been joined by welding or otherwise in the manufacture of the workpiece.

According to the present invention there is provided apparatus for milling surplus material from the surface of workpieces of elongated form, comprising a support, at least two cutter assemblies each having a power driven rotary cutter, adjustable mounting means for mounting the cutters on the support, at least one body member mounted beside the cutter on at least one side thereof and coaxially mounted therewith, which body member is rotatable around the cutter spindle independently of cutter rotation so that in operation of the apparatus there is a stage where it limits the depth of cut made by the cutters, the cutter assemblies being mounted with the cutters in opposed disposition and rotatable about spaced parallel axes, the cutters being movable toward and away from each other by means of the adjustable mounting, and the arrangement being such that in operation they are adjusted so as to be in contact with opposed areas of the workpiece and relative bodily movement between the workpiece and the rotating cutters enables superfluous material to be milled from these areas simultaneously.

The expression "workpieces of elongated form" is intended to embrace not only bars, tubes and the like but also workpieces such as closed rings or frames. The workpieces engaged by the cutter may be of any cross-section which will allow the cutters access to the surface thereof.

Preferably, the cutter assemblies are mounted in pairs with their cutters coplanar so that they contact opposed surfaces of the workpiece, but any even or odd number of cutters may be provided.

Four embodiments of the invention will now be described by way of example with reference to the accompanying drawings wherein:

FIG. 1 is a side view of a first embodiment of the invention;

FIG. 2 is an end view of the embodiment shown in FIG. 1;

FIG. 3 is a side view of a second embodiment of the invention;

FIG. 4 is a side view of a third embodiment of the invention;

FIG. 5 is a plan view of the embodiment shown in FIG. 4;

FIG. 6 is an enlarged detail showing a side view of the means used for clamping the cutters in the embodiment shown in FIGS. 4 and 5;

FIG. 7 is a horizontal section taken on the line VII—VII of FIG. 6;

FIG. 8 is a side view of a fourther embodiment of the invention; and

FIG. 9 is an end view showing the disposition of the cutters in the embodiment of FIG. 8.

Referring now to FIGS. 1 and 2 the apparatus of the first embodiment of the invention comprises a rectangular base 10, which is normally in the horizontal position in use and from which there extends, at right angles thereto, a frame 11. The frame 11 is formed of two posts 12 which are attached, to the mid-points of the opposed sides of the base 10 and which are connected to each other by upper and lower cross members 13 and 14 respectively. The base 10 and the frame 11 together provide a support for two cutter assemblies 15 each comprising an electric, pneumatic or other appropriate motor 16, which drives a rotary milling cutter 17 through a bevel gear arrangement in the housing 74 and which enables the final drive to be made at right angles to the motor axis. Rollers 18 (FIG. 1) are disposed on either side of the milling cutter 17 and these serve to limit the depth of cut made in a workpiece in operation. The cutter assemblies 15 are pivotally mounted on opposite sides of the base 10 such that they are inclined towards each other, and the cutting heads are coplanar but with their axes spaced apart in parallel relationship. This arrangement is achieved by mounting each of the two motors 16 on a pivot plate 19 and pivotally connecting the lower edge of each plate 19 to a pair of spaced lugs 20 near the end of the base 10; hinge pins 21 passing through the lugs 20 and through hinge plates 22 on the plate 19. The pivot plates 19 are disposed in overlapping side by side relationship and this allows an adjustment spindle 23 to extend between the two motors 16 and through apertures in the pivot plates 19 at points adjacent to their upper, inner edges. Housed within each of the apertures there is a horizontally disposed internally threaded sleeve 24. Each sleeve 24 receives a screw threaded end of the adjustment spindle 23, one end being provided with a left hand thread and the other with a right hand thread. The centre portion of the spindle 23 is supported in a plain bush 25 and a handwheel 26 is keyed to the spindle 23 on one side of the bush. The assembly forms a plummer block which on rotation of the handwheel causes the distance between the cutter assemblies 15 to increase or decrease. Thus adjustments can be made to cater for different sizes of workpiece placed between the cutters. A depth plate 27 is connected to the upper cross member 13 and extends upwardly between the cutters. This plate 27 forms a rest or stop for the workpiece. A guard 28 is also attached to the cross-member 13.

This first embodiment is primarily designed to remove weld flash from metallic rings or frames having a welded joint, and in operation the spacing of the cutters 17 is adjusted to suit the size of the workpiece, and the part of the frame to be treated is held between the contrarotating cutters and swung manually through an arc of approximately 180°. Thus weld flash is removed from the entire circumferential surface.

A second embodiment of the invention is illustrated in FIG. 3 and shows an arrangement of apparatus in which the cutters reciprocate over a stationary workpiece. The cutter assemblies 29 and 29a are mounted on an L-shaped support member 30 such that they assume a similar mutual disposition to the cutter assemblies 15 in FIGS. 1 and 2 but are as if turned through a right angle. The support member 30 comprises a vertically extending back plate 31 and a base member 32 which are connected together as a rigid structure. The cutter assembly 29 is pivotally supported from the back plate 31 by a horizontally extending yoke 33 and pivot pins 34. Torsion springs, not shown, bias the assembly to rotate about the pins 34 so that the milling cutter tends to move in a downward direction. The other cutter assembly 29a is slidably mounted on a ramp 35 but can be clamped in a required fixed position on the ramp by means of the lever 36. Thus the spaced relationship of the cutters 17 can be adjusted. The support member 30 is mounted within channels in a pair of slide rails 37 and is connected to the push rod 38 of a pneumatic ram 39. In operation the cutters 17 reciprocate over that part of the workpiece to be treated, a weld seam for example on a metal strip 40. In a modified arrangement the cutter assembly 29a is pivotally mounted and biased to urge its cutter 17 in an upward direction.

The embodiment shown in FIGS. 4, 5, 6 and 7 comprises a stand 41, a base plate 42, slidably supported on a pair of parallel rails 43, and a pair of cutter assemblies 44 which are pivotally mounted on the base plate 42. The base plate 42 is generally L-shaped in plan and is horizontally mounted on linear bearings 45 which engage the slide rails 43. Each of the cutter assemblies 44 which includes a drive motor is mounted for sliding movement on a composite slide plate 48 which is in turn pivotally supported by two linear bearings 47 on the base plate 42. The cutter assemblies 44 are mounted one at the end of each limb of the base plate such that they are offset with their cutting heads 49 coplanar. The cutting heads 49 are interconnected by means of a clamp generally indicated by the reference numerals 50 and now to be described in detail with reference to FIGS. 6 and 7.

The clamp 50 comprises an elongated frame structure having two spaced and parallel members forming a chassis 51. One end of the chassis 51 supports a pair of fixed housings 52 which locate bearings 53 for one of the rotary milling cutters 49 which is disposed between the frame members 51. A workpiece guide 54 in the form of a pair of upstanding members each having a V slot 55 is positioned adjacent to the milling cutter 49 and bolted to one of the outer faces of the chassis 51. The opposite end of the chassis 51 supports a bearing housing 56 which houses bearings 53 for the other milling cutter 49a and which is slidable on the chassis 51. The bearing housing 56 is also formed with V slots 57 which face and are complementary to the V slots 55. A pair of spaced parallel guide bars 58 are connected to one end of the bearing housing 56 and extend outwardly from the housing and beyond the end of the chassis 51, but parallel therewith. Each of the guide bars is slidably supported in a bearing block 59 bolted to the end of the chassis 51. The guide bars 58 thus control the movement of the bearing housing 56. An operating lever 60 extends upwardly and to one side of the bearing block 59. The lever 60 enables the operator to rotate the clamp assembly 50, and hence the cutters 49, bodily around the workpiece. Clamping is effected by a 2-way pneumatic ram 61, the piston of which is connected by means of a rod 62 to a lever 63 fixed to the end of the guide bars 58. The cylinder of the ram 61 is fixed to the chassis 51. A spring 64 is placed between the lever 63 and the bearing block 59 to act as a damper. The lever 60 also carries a manually operable valve (not shown) which controls the supply of pressurized air to the ram 61.

In operation of this embodiment, the work-piece, which may be a length of wire, rod, or tube formed from sections which have been joined together by butt welding, is passed through guides 65 on opposite ends of the stand 41. The guides 65 may comprise simple guide rings or the like or may be in the form of clamps which both guide the workpiece and enable it to be releasably secured in position on the stand. The cutter assemblies 44 are now slidden along the rails 43 so as to be in line with the area requiring treatment and tilted upwardly by means of a tilt lever 66 attached to one of the cutter assemblies 44 such that they are in a substantially horizontal position. The cutters are set in rotation and the valve on the operating lever 60 is operated to actuate the pneumatic ram 61 and move the slidable bearing housing 56 towards the fixed housings 52 so that the workpiece is clamped by the V slots 55 and 57.

The rotating cutters 49 and 49a are now moved through 180 degress around the face of the workpiece by moving the handle 60 forwards and backwards so that the clamp 50 rocks each of the cutter assemblies pivoting about its spindle 46.

A fourth embodiment of the invention, illustrated in FIGS. 8 and 9, includes cutter assemblies 69 similar to cutter assemblies 16, 29 and 29a and 44. Relative movement between the cutter assemblies 69 and the workpiece is brought about by rotating the workpiece 67 in a lathelike machine 68. One or more pairs of cutter assemblies 69 are mounted on a pair of fixed parallel slide rails 70 so that they can be moved longitudinally but not rotated. Each of the cutter assemblies is slidable in a direction parallel with the motor axis within an associated mounting 71 and is biased by spring means (not shown) so that its milling cutter can be urged into contact with the workpiece. The workpiece 67 is held between a thrust plate 72 and friction drive 73.

I claim:

1. Apparatus for milling surplus material from the surface of workpieces of elongate form comprising a support, at least two cutter assemblies each including a motor and a driven rotary cutter including a spindle therefor, adjustable mounting means for mounting the cutter assemblies on the support, shaft means connected to each cutter on one side only thereof and arranged so that the cutters are in opposed disposition and are at all times rotatable about spaced parallel axes normal to a plane passing laterally through both cutters, said shaft means extending on opposite sides of the plane, the axis of rotation of each cutter being at right angles to the axis of rotation of its driving motor, right angle drive means for transmitting the drive from each motor to its cutter, at least one body member mounted beside each cutter on at least one side thereof and rotatable about the cutter spindle independently of the cutter rotation and arranged to limit the depth of cut made by the cutters on a workpiece, said adjustable mounting means being operable to move said cutter assemblies towards and away from each other so as to enable said cutters to simultaneously contact and mill a plurality of substantially opposed areas of a workpiece positioned between said cutters.

2. Apparatus as claimed in claim 1 wherein the body member comprises a roller which rotates freely on the cutter spindle.

3. Apparatus as claimed in claim 1 wherein the cutter assemblies are mounted to the support for movement relative thereto in a direction parallel with the axes of the cutters and which includes means for supporting and rotating a workpiece about an axis parallel with the axes of the cutters.

4. Apparatus as claimed in claim 3 including means for adjusting the distance between the axis of rotation of the workpiece and the axis of each of the cutters.

5. Apparatus as in claim 1 wherein the drive means between said motors and said cutters are constructed and arranged to drive the respective cutters in contra rotation.

6. Apparatus as in claim 1 including support means for a work piece between the cutters constructed and arranged to permit relative bodily movement between a workpiece and the rotating cutters by manual rocking of said workpiece on the support.

7. Apparatus as in claim 1 wherein the mounting means for the cutter assemblies includes a common base member, and means for adjusting the base member relative to the support in either direction parallel with the axes of rotation of the cutters.

8. Apparatus as in claim 7 including means carried by said common base member permitting adjusting movement of said cutter assemblies at right angles to the axes of rotation of the cutters, and other means cooperating with said last named means permitting pivotal movement of said assemblies about axes parallel with but spaced from the axes of rotation of the cutters.

9. Apparatus as in claim 8 wherein the apparatus includes clamp means comprising two jaws, one associated with each cutter, each jaw being fixed in relation to its cutter, and means for moving the jaws relatively to each other to clamp a workpiece therebetween or to release a workpiece therefrom.

10. Apparatus as in claim 9 wherein each jaw includes V-shaped slots constructed and arranged to receive a workpiece and limit the depth of cut.

11. Apparatus as in claim 10 including a handle on the clamp means for enabling the clamp means and cutters to be rotated manually about a workpiece clamped by the clamp means.

12. Apparatus as in claim 7 wherein at least one of the cutter assemblies is pivotally mounted on said base member for movement about an axis parallel to the axis of rotation of said cutters whereby one cutter can be adjusted towards and away from the other cutter.

References Cited

UNITED STATES PATENTS

| | | | |
|---|---|---|---|
| 2,166,356 | 7/1939 | Hinsey | 51—80 |
| 2,388,872 | 11/1945 | Scarff | 90—17 X |
| 2,648,174 | 8/1953 | Bikles | 51—80 |
| 3,134,201 | 5/1964 | Burt | 51—84 |
| 3,455,205 | 7/1969 | Pankonin et al. | 90—17 X |
| 3,044,366 | 7/1962 | Bidart | 90—12 |
| 3,381,580 | 5/1968 | Walker | 90—12 |
| 3,457,830 | 7/1969 | Menissier | 90—15 |

GIL WEIDENFELD, Primary Examiner

U.S. Cl. X.R.

90—11, 17; 51—80